United States Patent [19]

Pope et al.

[11] Patent Number: 4,857,203

[45] Date of Patent: Aug. 15, 1989

[54] PROCESS FOR THE REMOVAL OF METAL IONS FROM AN AQUEOUS MEDIUM UTILIZING A COAL GASIFIER SLAG COMPOSITION

[75] Inventors: Brian G. Pope; Daniel J. Najvar, both of Baton Rouge, La.

[73] Assignee: The Dow Chemical Company, Midland, Mich.

[21] Appl. No.: 135,420

[22] Filed: Dec. 21, 1987

[51] Int. Cl.$^4$ .............................................. B01D 15/00
[52] U.S. Cl. ................................... 210/681; 210/688; 210/747; 210/912; 210/913; 210/914
[58] Field of Search ......... 210/681, 688, 747, 912–914

[56] References Cited

U.S. PATENT DOCUMENTS

| | | | |
|---|---|---|---|
| 4,170,550 | 10/1979 | Kamody | 210/23 |
| 4,377,483 | 3/1983 | Yamashita et al. | 210/670 |
| 4,530,765 | 7/1985 | Sabherwal | 210/663 |

*Primary Examiner*—Ivars Cintins
*Attorney, Agent, or Firm*—Llewellyn A. Proctor, Sr.; Dan R. Howard

[57] ABSTRACT

A coal gasifier slag composition, and process utilizing a coal gasifier slag composition for the removal of a metal ion, or the ions of a plurality of metals, from an aqueous medium by contact of said coal gasifier slag composition with said aqueous medium. The coal gasifier slag, which is regenerable by contact with a dilute acid, is employed as a contact mass for the removal from an aqueous medium of a metal ion, or the ions of a plurality of metals, derived from Groups IB through VIIB, IIA through VA, and VIII of the Periodic Table of the Elements. The coal gasifier slag is useful for removing a metal ion, or the ions of a plurality of metals, from industrial waste water, groundwater, mine water and the like, or as a landfill, or as a protecting layer adjacent to or surrounding land fills, surface impoundments, tank farm beds and the like.

9 Claims, No Drawings

PROCESS FOR THE REMOVAL OF METAL IONS FROM AN AQUEOUS MEDIUM UTILIZING A COAL GASIFIER SLAG COMPOSITION

FIELD OF THE INVENTION

This invention relates to a coal gasifier slag composition, and a process utilizing said coal gasifier slag composition for the removal of a metal, or metals, from a metal or metals-containing aqueous, or water-containing fluid, contacted therewith. In particular, it relates to the removal of soluble metal ions from aqueous liquids, or water-containing liquids, contacted with a coal gasifier slag utilized as a bed through which said liquid is flowed, or as a contact mass dispersed within a static pool of said liquid. The coal gasifier slag is useful for removing a metal ion, or mixture of metal ions from industrial waste water, groundwater, mine water, and the like, or as a protecting layer adjacent to or surrounding land fills, surface impoundments, tank farm beds or the like; and useful per se as a land fill.

BACKGROUND AND PROBLEMS

Discharges from diverse industrial facilities, inclusive of accidental spills and the runoff from dumpsites, have created direct hazards to the use of land. Serious drinking water contamination and other health problems have sometimes resulted. Marshlands and estuaries have likewise been adversely affected by the runoff from contaminated streams.

Effluents containing dispersed metals components, or solutions of a metal compound, or metal compounds, e.g. salts, represent a major class of metal contamination. Metal compounds, or salts produced as by-products of diverse industrial facilities often require cleanup for removal of metals prior to discharge to the environment. Likewise, a need or desire may exist to economically recover the metals values. For example, the salts of gold, platinum and silver, e.g., silver salts, such as silver chloride, a metal salt of considerable value, is often found in the waste streams of certain industrial processes, for which reason per se its recovery is highly desirable. Other contaminant metals, e.g. such heavy metals as lead, mercury, chromium, and zinc are toxic and hazardous per se. Hence these metals may present a health risk if not removed from the by-product streams of industrial plants prior to discharge to the environment. Yet other contaminant metals may constitute both a health hazard and an economic loss due to the potential value of the metals, e.g. zinc, chromium, cadmium and nickel. Sometimes too, it is necessary to remove non-toxic metals, e.g. iron, calcium and magnesium, from process streams because their presence is detrimental to downstream unit operations.

A large number of materials of considerable diversity have been reported, in the technical and patent literature, as capable of removing a variety of environmentally unacceptable compounds, inclusive of metals, from solution, albeit these materials may in many cases leave much to be desired in terms of their specificity and effectiveness. Some of these materials are characterized as chars, ashes, and slags.

In U.S. Pat. No. 4,170,550, there is described a process for reducing the quantity of foul aqueous effluents in a raw off-gas containing environmentally unacceptable compounds such as sulfur, hydrogen cyanide, ammonia and compounds of sulfur, hydrogen cyanide and ammonia, and dissolved salts of heavy metals. The raw gas from a gasifier containing such impurities is recycled to the gasifier wherein these components are oxidized, reduced, or decomposed into environmentally innocuous compounds that can be released to the atmosphere, or removed with the residue.

In U.S. Pat. No. 4,377,483 a steel slag is employed as a contact material for the removal from a liquid of at least one dissolved metal, such as mercury, cadmium, lead or chromium. The metal, or combination of metals, is absorbed and fixed on the slag particles which are then separated from the waste liquid.

Japanese Pat. No. 53-60372 discloses the use of a steel slag to neutralize acidic metals-containing aqueous streams, the heavy metals absorbing as hydroxide onto a porous calcium silicate; Japanese Pat. No. 54-137490 discloses the removal of arsenic and heavy metals by neutralization with a steel slag or a $H_3PO_4$ containing stream: and Japanese Pat. No. 54-80273 discloses the removal of heavy metals, e.g. iron, lead and cobalt, from an aqueous waste stream after stirring with the powdered steel slag and filtering.

Japanese Pat. No. 55-134640 discloses the use of an admixture of calcined fly ash and bentonite (clay) to remove such metals as zinc, chromium, and lead from an aqueous medium: Japanese Pat. No. 52-78687 discloses the use of an admixture of calcined fly ash and bentonite (clay) to form pellets useful as an adsorbent for metals, viz. lead, zinc, copper, mercury, cadmium and chromium; and East German Pat. No. 146,444 discloses the use of fly ash to remove mercury from a solution, the mercury being bonded adsoptively and/or chemically to the ash, and then filtered.

East German Pat. No. 220,850 discloses the use of Winkler Generator Ash for the removal of mercury from waste water via passage of the waste water through a packed column. The mercury is converted to sulfide.

Japanese Pat. No. 51-10654 discloses the use of kiln ash admixed with limestone (quicklime) to clean the water of organics and various other materials.

U.S. Pat. No. 4,530,765 discloses for the removal of inorganic impurities from a stream the use of high surface area calcined materials, to wit: clay, zeolites, coal ash, fly ash and volcanic ash. The materials are calcined and activated at temperatures of 1000+°C.

There is a growing need for new products and technologies to meet pollution problems in many industries. There is a present need for high quality water feed in many industries, e.g., in the electronics industry. For example, the printed circuit industry requires water with a total of only 10 parts per billion of heavy trace metals. The nuclear industry also is faced with the problem of removing trace metals from water. EPA pollution control guidelines for drinking water require a limit of one part per million parts of water (ppm) or less on most toxic metals. Further, the EPA is considering lowering the limits on certain toxic metal ions, and this will impact on a larger number of industries than presently. Precipitation, electroplating and other conventional methods can reduce the pollution by toxic metals to only the 5-20 ppm range, but this is not necessarily enough. It is becoming increasingly important to economically prepare purer water for use by processing industries, and for the discharge of purer water to the environment. Additionally, there is a need for compositions, and process for the use of such compositions, which can be employed to shield against land contamination by toxic metal solutions leaked from land fills, tanks, and impoundments. Moreover, there is a need for the development of new compositions, and the development of processes utilizing such compositions for the removal of metals from metals-containing aqueous solutions; particularly compositions of high metals loading capabilities which are more economical and efficacious for the removal of metals without difficult filtrations, and large volume handling problems.

OBJECTS

It is, accordingly, the primary objective of the present invention to meet these and other needs.

In particular, it is an object to provide a novel process for the removal of the ions of a metal, or the ions of a plurality of metals, from a fluid such as a feed stream, product stream, by-product stream, intermediate process stream, spill, or other fluid which may contain metal ions as contaminants, or as recoverable metals values.

A further object is to provide a novel composition, and process for the use of such composition, employed as a landfill, bed, or contact mass surrounding a source of hazardous or toxic metal, or hazardous or toxic metals-containing liquid contaminant with which the leaking solution is contacted to suppress, inhibit, or prevent escape of any substantial amount of the liquid contaminant beyond said bed, or contact mass.

A further, and more specific object is to provide a novel, highly economical and efficient process, utilizing a contact mass which can be used to remove the ions of a metal, or the ions of a plurality of metals, from a flowing aqueous stream within which the ions of the metal, or ions of a plurality of metals, is dissolved at high loading levels; and process for the regeneration of said metal, or metals-containing contact mass.

THE INVENTION

These objects and others are achieved in accordance with the present invention embodying a coal gasifier slag composition, and process utilizing said coal gasifier slag composition for the removal of the ions of a metal, or the ions of a plurality of metals, from an aqueous medium within which is dispersed said metal ions, or ions of a plurality of metals, by contacting said aqueous medium with said coal gasification slag to deposit said metal ions, or ions of a plurality of metals, on the coal gasification slag and remove same from said aqueous medium. If desired, the deposited metal ions, or ions of the plurality of metals, can subsequently be separated and recovered from the coal gasification slag, and the coal gasification slag regenerated or reactivated by contact with a dilute acid.

It has been found, surprisingly, that a particulate product of a coal gasification plant, viz. a coal gasification slag, particularly and preferably a mixed oxide glass slag as subsequently described, can be employed to remove the ion of a metal, or the ions of a plurality of metals, from an aqueous medium, or medium constituted of water, or fluid within which water is dispersed as a continuous or discontinuous phase which contains the ions of said metal, or ions of said plurality of metals. On contact of an aqueous medium containing the ions of a metal, or the ions of a plurality of metals, with a coal gasification slag, the ions of the metal, or ions of the plurality of metals, are deposited on the slag and removed from the aqueous medium. The coal gasification slag and the aqueous medium can be admixed one with the other (the coal gasification slag with the aqueous medium, or the aqueous medium with the coal gasification slag), or the aqueous medium can be flowed through the coal gasification slag to remove the ions of the metal, or ions of the plurality of metals, from the aqueous medium; the ions of the metal, or ions of the plurality of metals, in either event being deposited on the slag and thereby effectively removed from the aqueous medium, particularly by separation of the metal, or metals-containing slag from the aqueous medium.

An aqueous medium in accordance with this invention is defined as a liquid within which water is dispersed sufficient to dissolve and transport the metal ion, or the ions of a plurality of metals, to the exterior or interior surfaces of the coal gasifier slag when the aqueous medium is contacted therewith. The water within which the metal ions, or the ions of a plurality of metals, are dispersed is present as a continuous or discontinuous phase, and includes aqueous solutions of the metal ion, or the ions of a plurality of metals, as well as organic or hydrocarbon liquids or solvents—e.g. methanol, acetone, methyl chloroform, benzene, toluene, xylene and the like—within which water is dissolved, dispersed or present as a continuous or discontinuous phase in amount sufficient to dissolve and transport the metal ion, or the ions of a plurality of metals, to the surface of the coal gasifier slag.

A preferred coal gasification slag is one prepared from a slurry of coal in water fed with oxygen an oxygen-containing gas, or air, into a gasifier and the coal pyrolyzed, and gasified at temperatures ranging between about 1250° C. and 1650° C., preferably between about 1300° C. and 1425° C., sufficient to produce fuel gas, and a residue of inorganic mineral matter. The inorganic mineral matter residue, at temperatures ranging from about 1250° C. to about 1650° C., preferably from about 1300° C. to about 1425° C., is quenched with water to temperatures ranging from about 275° C. to about 400° C., preferably from about 300° C. to about 350° C., to form, on drying, a free flowing particulate glassy black solid.

A preferred process for the production of a highly suitable coal gasifier slag useful for the removal of a metal, or metals, from a metal or metals-containing aqueous medium is described in a paper prepared for The Fourth Annual Pittsburgh Coal Conference, titled "Initial Experience of The Commercial Dow Coal Gasification Plant" by John P. Henley and David G. Sundstrom of The Dow Chemical Company, Plaquemine, La., U.S.A, herewith incorporated by reference. Publication of the process was made at the Pittsburgh Coal Conference between Sept. 28, 1987 and Oct. 2, 1987. The publication describes a two-stage reactor system. The first stage of the two-stage reactor system is a slurry bed, entrained flow, partial oxidation reactor, of horizontal orientation, which operates at slagging conditions. Coal slurry and oxygen are fed via nozzles into the two ends of the reactor. An outlet is located at the bottom of the reactor for the output of slag to a slag quench water vessel, and an outlet at the top of reactor communicates said first stage reactor with the second stage reactor, a vertically oriented reactor perpendicular with said first stage reactor. The second stage of the reactor system is also an entrained flow reactor, an upflow entrained reactor into which additional coal slurry is injected into hot product gas from the first stage. In the second stage reactor, the sensible heat from the first stage is recovered by vaporizing the water in the slurry, followed by heating, pyrolyzing, and partially gasifying the coal. Unconverted char from the second stage is recycled to the first stage for complete conversion. An inorganic mineral matter residue, or slag, from the first reactor, at temperatures ranging from about 1250° C. to about 1650° C., preferably from about 1300° C. to about 1425° C., is passed through the outlet in the bottom of the reactor and quenched with water in the slag quench water vessel to a temperature of from about 275° C. to about 400° C., preferably from about 300° C. to about 350° C., to produce a coal gasifier slag having, on drying, the appearance of a glassy black solid which has been found admirably suitable as a medium useful for the removal of a metal, or metals, from a metal or metals-containing aqueous medium.

A bituminous or sub-bituminous coal, or a lignite or sub-lignite coal which has an alkali type ash, can be employed for the production of a coal gasifier slag useful for the removal of a metal, or metals, from an aqueous medium in accordance with the practice of this invention. Western bituminous and sub-bituminous coals are particularly preferred and encompass coals from the Powder River Basin. Typically these and other Western coals have a high alkali ash, and are rich in calcium and magnesium.

The composition of the coal gasifier slag, a mixed metals oxide glass prepared by this process, is given as follows:

| Composition[1] | Typical (wt. %) | Preferred (wt. %) |
|---|---|---|
| $SiO_2$ | 20–35 | 24–32 |
| $Fe_2O_3$ | 3–12 | 5–9 |
| $Al_2O_3$ | 10–22 | 14–19 |
| CaO | 15–35 | 20–26 |
| MgO | 1–5 | 4–5 |
| $K_2O$, $Na_2O$ | 0.1–3 | 1–3 |

[1]The components are expressed in terms of their highest oxidized state, and represent the oxide equivalent of the ions found in the slag.

Other identifying characteristics of the coal gasifier slag are given as follows:

| | |
|---|---|
| Crystallinity (measured by x-ray diffraction) | <2% |
| Surface area of total particle size distribution (average B.E.T. nitrogen), $m^2/g$ | 30–75 |
| Particle Size Distribution | Net % |
| +10 mesh (U.S. Std.) | 30 |
| +20 | 69 |
| +60 | 94 |
| +100 | 96 |
| +325 | 98 |
| Bulk Density, gms/cc | 1.3 to 1.5 |
| Specific Gravity | 2.7 to 2.8 |
| Initial Deformation Temperature, °C. | 1235 |
| Fluid Temperature, °C. | 1300 |

The coal gasifier slag, unlike most slags, e.g. steel slag, is highly amorphous. Its crystallinity is generally less than 2% which, e.g., is sharply contrasted with steel slag which generally has a crystallinity greater than 80%. If the coal gasifier slag of this invention is heated to temperature above 900° C. and slowly cooled its crystallinity can be increased to some extent; but when its crystallinity is increased, its ability to remove a metal, or metals, from a metal or metals-containing aqueous medium is decreased. The coal gasifier slag, after formation in the coal gasification process is very stable, and only begins to soften, and eventually melt, on heating at temperatures well above 900° C. It is well known that most commercial materials used for ion exchange or metal ion separation cannot withstand temperatures much above 120° C., and yet in the use of the coal gasifier slag for metal ions separation at temperatures above 120° C. the efficiency of the slag for metal ions removal can be increased. Quite clearly, however, the slag cannot be heated to its softening temperature for to do so would impair its ability to remove metals from an aqueous medium.

The coal gasifier slag is quite stable, and significant amounts of slag components can be leached therefrom only with difficulty. At neutral pH, the coal gasifier slag can be used to remove metal ions from an aqueous medium and, at the same time, its efficiency can be improved by warming the solution. The components of the slag, on warming, will not be leached. The coal gasifier slag is also selective for certain metals vis-a-vis light metals for which reason it can be used to selectively remove certain metal ions, particularly cations, from brine or other aqueous solutions, as well as from organic streams in which some water is present, or added. There appears a lack of affinity between the coal gasifier slag and the light metals, e.g. alkali metals. Furthermore, metals can be subsequently recovered, and the coal gasifier slag regenerated, by contacting the coal gasifier slag with a dilute acid, —e.g. a dilute mineral acid such as $H_2SO_4$, $H_2NO_3$, HCl or the like—suitably at ambient temperature, to redissolve the metals, seperate and release the bound metals from the coal gasifier slag.

The coal gasifier slag can be used in various forms and shapes, but preferably it is used in the same physical form as when removed from the coal gasification process after the water quench. The coal gasifier slag in particulate form, it appears, is as efficient, and usually more efficient, than in other physical forms of the slag. A particulate mass of the coal gasifier slag can be admixed with a metal, or metals-containing solution, and after setting for a sufficient period of time the metal, or metals will be removed from the solution by deposition on the slag. A more preferred, and usually more efficient method of utilizing the coal gasifier slag however is to charge the slag into a column to form a bed through which a metal, or metals-containing solution can be passed, while providing a sufficient residence time or contact time for the metal, or metals to deposit on the slag. The effectiveness of the coal gasifier slag in removing metals from metals-containing solutions differs dependent to a large degree upon the nature of the metal ions themselves, which makes several types of operation feasible dependent on the affinity of the metal, or metals, to deposit on the slag. One type of operation would thus benefit by use of an addition stage, or stages, or recycle step wherein a partially demetallized metals-containing stream is passed through the same, a regenerated, or fresh bed of the coal gasifier slag. Another type of operation may benefit by the removal of residual metals components by an entirely different absorbent, after removal of a major concentration of the metals by contact with a bed of the coal gasifier slag, whether or not the used bed of coal gasifier slag were subsequently disposed of or regenerated for further use.

The coal gasifier slag is also useful for placement under a land fill, or as a portion of a landfill, e.g. a municipal landfill, surface impoundment, tank farm, mining operation or other installation wherein there exists a potential for the venting, or the leakage of aqueous metal solutions to the environment. For example a mass of the coal gasifier slag can be placed under a hazardous waste pit, landfill, surface impoundment (pond) or tank farm such that leaked aqueous metal solutions therefrom will contact the mass or bed of coal gasifier slag and the metal, or metals thereof removed from the aqueous solutions and retained by the slag prior to its escape to the environment; or, the slag retained and collected for further treatment. The coal gasifier slag can also be used to manage and contain spills. For example, if spills or leaks of aqueous solutions of metal salts occur, as from some area of an industrial process, coal gasifier slag can be dispersed onto or into the leaking solution, or "pillars" of slag contained within a porous fabric can be laid onto or into the leaking solution to uptake and remove the metals from the solution.

A metal ion, or ions of a plurality of metals, especially a metal cation, or metals cations, encompassed by and derived from Groups IB, IIB, IIIB, IVB, VB, VIB, VIIB, IIA, IIIA, IVA, VA, and VIII of the Periodic Table of The Elements (Sargent-Welch Scientific Company, Copyright 1968) can be removed in varying levels and degrees of effectiveness from an aqueous medium via contact with a coal gasifier slag. Exemplary of such metals are, e.g., Cu, Hg, Ti, V, Cr, Mn, Ba, Al, Pb, As, Fe and the like. The coal gasifier slag has, in particular, proven particularly effective or useful in the removal from an aqueous medium of a metal cation, or mixture of metal cations, derived from the following groups of The Periodic Table of The Elements, to wit:

| Metal cation(s) of Group | Exemplary Metal From Which Metal Cations Are Derived |
| --- | --- |
| IB | copper, silver, gold |
| IIB | zinc, cadmium, mercury |
| IVB | zirconium |
| VB | vanadium |
| VIB | chromium |
| VIIB | manganese |
| IVA | tin, lead |
| VIII | iron, nickel, platinum, ruthenium |

It has been found, for example, that a coal gasifier slag can readily remove such metal cations as $Cu^+$, $Cu^{2+}$, $Ag^+$, $Au^+$, $Zn^{2+}$, $Cd^{2+}$, $Zr^{2+}$, $Va^{2+}$, $Cr^{3+}$, $Mn^{2+}$, $Mn^{4+}$, $Fe^{2+}$, $Fe^{3+}$, $Ni^{2+}$, $Pt^{2+}$ and the like, alone or in admixture, from an aqueous medium, e.g. water, an aqueous solution, brine, an organic liquid within which water is dispersed as a continuous or discontinuous phase, or other water or moisture-containing fluid. On the removal of these metal cations from a brine, the alkali-metal cations will remain in solution.

The reason, or reasons, for the effectiveness of the coal gasifier slag in removing a metal cation, or mixture of metal cations from an aqueous medium is at best only partially understood, but some observations have been made. The coal gasifier slag is an amorphous glassy composition upon which the metal cations are deposited apparently through a series of complex, apparently independent mechanisms. Coprecipitation with iron and aluminum hydroxides of the slag particles is believed to occur. In addition, adsorption of the metal cations upon the slag surface occurs, and ion exchange with metal cationic species in this slag has been observed. Moreover, cations are removed to some degree by alkaline precipitation. The coprecipitation phenomenon has been shown by the release of aluminum or iron, or both, on exposure of the coal gasification slag to extreme pH, followed by precipitation of $Al(OH)_3$ and/or $Fe(OH)_3$ induced through pH shift associated with neutralization; followed by adsorption of other metal ions onto the precipitated $Al(OH)_3$ or $Fe(OH)_3$ surface. Direct adsorption of metal cations onto the slag surface, possibly as silicon, aluminum oxide or iron oxide surface sites, has been observed. The coprecipitation and direct adsorption phenomena are pH dependent, the optimum pH for the removal of most metal cations ranging between 5 and 9. Simple ion exchange is believed to occur, the exchange involving exchange reactions between possibly the Mg, K and Na components of the slag. Metal hydroxide precipitation is believed to play a role in the overall removal of metal cations from the slag, based in part on the observation of a near neutral pH achieved through the neutralization phenomenon when various cations are removed by precipitation at different pH levels. Only lead appears to be removed via a single mechanism, viz. a precipitation mechanism. In the case of multiple metals removal from an aqueous medium, data indicate that the mechanism is largely a precipitation phenomena, strongly suggesting metal-metal interactions in solution. Nonetheless, whatever the mechanisms involved, or their complexity, a metal cation, or mixture of metal cations, can be effectively removed from solution by contact with the coal gasifier slag.

The invention, and its principle of operation, will be more fully understood by reference to the following examples presenting data illustrating its more salient features. All parts are given in terms of weight except as otherwise specified.

EXAMPLE 1

In conducting a first series of tests, a number of solutions were prepared each of which contained a metal salt added to water without pH adjustment to provide a single metal cation in measured concentration within the aqueous solution. To a column was added 1000 cc of a coal gasifier slag to form a fixed bed, the slag having been directly obtained from a two stage coal gasification unit (utilizing a Western type coal), as earlier described. In the first column of Table I the specific metal cation is identified, and, in the second column, the concentration of the metal cation within the aqueous solution is given in parts of metal cation per million parts of water (by weight). These solutions, at ambient temperature, were each used as a feed to the column, each having been gravity fed through the bed of coal gasification slag and the effluent then analyzed by an Atomic Absorption Unit (flame) or Inductively Coupled Plasma Spectrophotometer to determine the concentration of the metal cation in the column effluent. The concentration of metal cation remaining in each effluent is given in the third column of Table I. The fourth column of the Table gives the percent of each of the metals recovered, or removed by the slag.

TABLE I

SINGLE METAL CATION REMOVAL
1000 cc Bed of Coal Gasification Slag
Effluent pH = 7 to 8

| Metal Cation | Feed (ppm) | Effluent (ppm) | % Metals Recovered |
|---|---|---|---|
| $Cu^{2+}$ | 191 | <0.1 | 99.9 |
| $Fe^{3+}$ | 116 | <0.1 | 99.9 |
| $Ag^{30}$ | 153 | <0.1 | 99.9 |
| $Au^{30}$ | 24 | <0.1 | 99.9 |
| $Pt^{2+}$ | 30 | <0.1 | 99.9 |
| $Cr^{3+}$ | 28 | 0.2 | 99.3 |
| $Mn^{+7}$ | 25 | <0.1 | 99.9 |
| $Pb^{2+}$ | 9 | <0.1 | 99.9 |

The high effectiveness of the coal gasifier slag in removing the metal cations from solution in each case is apparent.

The example immediately following demonstrates the effectiveness of the coal gasifier slag in simultaneously removing a spectrum of metals cations from an aqueous solution, as contrasted with metal hydroxides, i.e., caustics or lime, heretofore known as useful in the removal of metals cations from aqueous solutions.

EXAMPLE 2

A single aqueous metals cations-containing solution was prepared from a portion of water to which a mixture of metal salts was added. Each of the metals of the salts are identified in the first column of Table II.

Aliquots of the aqueous metals cations-containing solution were admixed, (1) with 1000 cc of a coal gasifier slag to pH=7.5, (2) with 1000 cc of sodium hydroxide to pH=7.5, (3) with 1000 cc of calcium hydroxide to pH=7.5, and (4) with 1000 cc of sodium hydroxide to pH=12. Each of aliquots 1, 2, 3 and 4, respectively, was then filtered to obtain a liquid which was analyzed for metals by an Atomic Absorption Unit (flame) or Inductively Coupled Plasma Spectrophotometer. The test results for each of these runs in terms of percent metals removed, by weight, are given in Table II.

TABLE II

| Metal | Slag pH 7.5 | NaOH pH 7.5 | Ca(OH)$_2$ pH 7.5 | NaOH pH 12 |
|---|---|---|---|---|
| iron | 99.9 | 97.8 | 97.6 | 99.9 |
| copper | 99.9 | 98.0 | 95.6 | 99.4 |
| lead | 99.9 | 89.7 | 90.4 | 87.9 |
| silver | 99.9 | 96.6 | 96.1 | 99.9 |
| aluminum | 99.4 | 96.6 | 95.5 | 63.9 |
| chromium | 99.6 | 73.3 | 71.3 | 98.8 |
| zinc | 99.6 | 94.1 | 95.2 | 97.0 |
| cadmium | 99.6 | 21.6 | 41.1 | 99.8 |
| manganese | 99.8 | 39.5 | 58.7 | 85.4 |

These data clearly show the high degree of effectiveness of the coal gasification slag in removing metals from an aqueous solution; a degree of effectiveness greater than obtained by conventional hydroxide precipitation in each instance at similar conditions. In the removal of multiple metals from solution, it is believed that the dominant mechanism involves a hydroxide precipitation phenomenon.

The following example shows the selective removal of chromium and iron cations from a brine solution.

EXAMPLE 3

Over 5000 gallons of a 15% lithium bromide brine solution containing 17 ppm chromium (trivalent) and 500 ppm iron, both soluble and particulate, was passed through a packed bed of coal gasifier slag. The column was six inches in diameter and 5 feet in length and contained approximately 1 cubic foot of slag. The brine solution was passed through the column at a rate of 0.5 to 2.0 gallons per minute. The resulting effluent contained <0.2 ppm of both chromium and iron while the concentration of lithium bromide in the brine solution remained at 15%.

The following exemplifies the removal of copper cations from an aqueous solution containing salts of cuprous or cupric chloride, or both.

EXAMPLE 4

A 48 cu ft bed of coal gasifier slag was used to remove over 350 lbs of copper from 500,000 gallons of water. The bed consisted of an open trough which was 1.5 feet deep, the 2 feet wide and sixteen feet long. The trough sat at approximately a 30 degree angle and was gravity fed from the top. Flow rates as high as 40–50 gallons per minute were utilized in this operation. The copper concentration in the feed ranged from 400 ppm to approximately 1%. The effluent stream contained less than 0.8 ppm of copper.

The following exemplifies the removal of metals from a non-flowing stream, and the greater effectiveness of warm solutions in removing metal cations from solution.

EXAMPLE 5

A pressure vessel was charged with 100 ml of a 600 ppm copper solution and 10 grams of coal gasifier slag. The contact time was one hour with no agitation. The percent copper removal versus reaction temperature is shown below:

| Temp, °C. | % Cu removed |
|---|---|
| 24 | 5% |
| 75 | 40 |
| 100 | 80 |
| 150 | 82 |
| 200 | 98 |

The example following again demonstrates the selective removal of iron from a brine, in this instance a sodium chloride brine.

EXAMPLE 6

A saturated sodium chloride solution, containing approximately 300 grams of sodium chloride per liter, was spiked with 36 ppm trivalent iron. The solution was passed through a 200 cc packed bed of coal gasifier slag at a flow rate of 100 cc a minute. The effluent stream contained less than 0.4 ppm iron. The sodium concentration was not altered.

The following exemplifies the removal of iron from an organic solvent within which water was dispersed.

EXAMPLE 7

500 ml of 1,1,1-trichloroethane was saturated with water and spiked with 65 ppm of trivalent iron. This system was passed through a 1000 cc packed bed of coal gasifier slag at a rate of approximately 200 cc per minute. The resulting effluent contained less than 1 ppm iron.

In contrast, in a run similar in all respects except that the 1,1,1-trichloroethane was anhydrous and the packed bed drained of water prior to initiation of the run, none of the iron was removed from the 1,1,1-trichloroethane.

The following two examples demonstrate the recovery of precious metals from solution.

EXAMPLE 8

3500 ml of an aqueous solution containing 153 ppm silver was passed through a 1000 cc packed bed of coal gasifier slag. The resulting effluent contained a non-detectable amount of silver.

EXAMPLE 9

An aqueous solution containing 24 ppm gold and 30 ppm platinum was passed through a 300 cc packed bed of coal gasifier slag. No gold or platinum was found in the effluent stream.

These and other data have shown that the coal gasifier slag is a particularly effective medium for use in the removal of a metal cation, or mixture of metal cations, from a metal cation or metals cations-containing aqueous medium. Unlike many materials commercially used for such purpose, large amounts of the metal, or metals components, are not leached from the slag and added to the metal cation, or metals cations containing medium from which the metal cation, or metals cations are being removed. Ideally, of course, a medium used for metal cation removal should not add other metals to the stream.

It is apparent that various modifications can be made, as will be apparent to those skilled in this art, without departing the spirit and scope of this invention.

Having described the invention, what is claimed is:

1. A process for removing at least one ion of a metal selected from the group consisting of Groups IB through VIIB, IIA through VA, and VIII of the Periodic Table of the Elements from an aqueous medium within which said at least one metal ion is dispersed which comprises:
    forming a particulate mass of a coal gasifier slag comprising a mixed metals oxide glass, the metal oxide constituents of which are given as follows:

|  |  |
|---|---|
| $SiO_2$ | 20-35 wt. |
| $Fe_2O_3$ | 3-12 |
| $Al_2O_3$ | 10-22 |
| CaO | 15-35 |
| MgO | 1-5 |
| $K_2O$, $Na_2O$ | 0.1-3, and | contacting together said metal ion-containing aqueous medium and said mass of coal gasifier slag sufficient to deposit said metal ion into said coal gasifier slag.

2. The process of claim 1 wherein the metal ion of the aqueous medium contacted with said mass of coal gasifier slag, is selected from the group consisting of Groups IB, IIB, IVB, VB, VIB, VIIB, IVA and VIII of the Periodic Table of the Elements.

3. The process of claim 2 wherein the metal from which the metal ion of the aqueous medium contacted with said mass of coal gasifier slag is selected from the group consisting of copper, silver, gold, zinc, cadmium, mercury, zirconium, and vanadium.

4. The process of claim 1 wherein the metal oxide composition of the coal gasifier slag with which the metal ion-containing aqueous medium is contacted is given as follows:

|  |  |
|---|---|
| $SiO_2$ | 24-32 wt. % |
| $Fe_2O_3$ | 5-9 |
| $Al_2O_3$ | 14-19 |
| CaO | 20-26 |
| MgO | 4-5 |
| $K_2O$, $Na_2O$ | 1-3. |

5. The process of claim 1 wherein the coal gasifier slag composition with which the metal ion-containing aqueous medium is contacted is as follows:
    (a) crystallinity (x-ray diffraction) <2
    (b) Total Surface area (B.E.T. nitrogen), $m^2g$ 30-75
    (c) Particle Size Distribution

| U.S.A. Std. wt. % | | |
|---|---|---|
| +10 | mesh | 30 |
| +20 |  | 69 |
| +60 |  | 94 |
| +100 |  | 96 |
| +335 |  | 98 |

(d) Bulk Density, gm/cc about 1.3 to 1.5
(e) Specific Gravity about 2.7 to 2.8
(f) Initial Deformation Temperature, °C. about 1235
(g) Fluid Temperature, °C. about 1300

6. The process of claim 1 wherein the coal gasifier slag is
    a coal gasifier slag prepared from a slurry of coal in water fed with oxygen or an oxygen-containing gas into a gasifier and the coal pyrolyzed, and gasified at temperature ranging between about 1250° C. and about 1650° C. sufficient to produce fuel gas and a residue of inorganic mineral matter, and
    the inorganic mineral matter is quenched with water to temperatures ranging from about 275° C. to about 400° C. to form said coal gasifier slag.

7. The process of claim 1 wherein the mass of coal gasifier slag and the aqueous medium are physically admixed one with the other to deposit the metal ion from the aqueous medium upon the coal gasifier slag.

8. The process of claim 1 wherein the mass of coal gasifier slag is employed as a protective layer, or landfill adjacent a waste pit, tank, surface impoundment, or mine, for removing a metal ion from an aqueous medium discharged therefrom.

9. The process of claim 1 wherein the mass of coal gasifier slag is employed as a fixed bed within a column, and the metal ion containing aqueous medium is passed through said fixed bed of coal gasifier slag to deposit said metal ion upon said coal gasifier slag.

* * * * *